(12) United States Patent
Lapicque et al.

(10) Patent No.: US 10,034,007 B2
(45) Date of Patent: Jul. 24, 2018

(54) NON-SUBSAMPLED ENCODING TECHNIQUES

(75) Inventors: Olivier Lapicque, San Jose, CA (US); Franck Diard, Mountain View, CA (US)

(73) Assignee: NVIDIA Corporation, Santa Clara, CA (US)

(*) Notice: Subject to any disclaimer, the term of this patent is extended or adjusted under 35 U.S.C. 154(b) by 346 days.

(21) Appl. No.: 13/112,025

(22) Filed: May 20, 2011

(65) Prior Publication Data

US 2012/0294364 A1 Nov. 22, 2012

(51) Int. Cl.
*H04N 19/186* (2014.01)
*H04N 19/117* (2014.01)

(52) U.S. Cl.
CPC ......... *H04N 19/186* (2014.11); *H04N 19/117* (2014.11)

(58) Field of Classification Search
CPC ..................... H04N 19/186; H04N 19/117
See application file for complete search history.

(56) References Cited

U.S. PATENT DOCUMENTS

| 2005/0031199 A1* | 2/2005 | Ben-Chorin et al. ......... 382/162 |
| 2008/0166043 A1* | 7/2008 | Bassi et al. .................... 382/167 |
| 2009/0147856 A1* | 6/2009 | Song et al. .............. 375/240.23 |

* cited by examiner

*Primary Examiner* — Nam Pham

(57) ABSTRACT

Techniques for non-subsampled video encoding of R'G'B' data using Y', Cb and Cr data to generate compressed data wherein the Y'-plane comprises three separate color frames that are not interleaved, and recovering the data therefrom.

20 Claims, 6 Drawing Sheets

NON-SUBSAMPLED ENCODING TECHNIQUES

BACKGROUND OF THE INVENTION

Computing devices have made significant contributions toward the advancement of modern society and are utilized in a number of applications to achieve advantageous results. Numerous devices, such as computers, game consoles, smart phones, and the like have facilitated increased productivity and reduced costs in communicating and analyzing data in most areas of entertainment, education, business and science. The rendering and displaying of images is an important aspect of contemporary computing devices. Image rendering, storage and displaying tends to be computationally intensive, consume large communication bandwidth and memory storage capacity. Therefore, contemporary computing device typically use data encoding and decoding techniques to compress and decompress image data for storage, transmission and processing.

One common form of compression is the H.264/MPEG-4 video compression standard jointly developed by the International Telecommunication Union (ITU-T) Video Coding Experts Group (VCEG) and the International Organization for Standardization International Electrotechnical Commission (ISO/IEC) Moving Picture Experts Group (MPEG). Referring to FIG. 1, a video encoding/decoding device 100 according to the conventional art is illustrated. Encoding begins with receipt of frames of video data 110. In one implementation, the computing device may render video frames in R'G'B' color space. The image frames in R'G'B' color space (4:4:4) are down sampled to generate Y'CrCb color space (4:2:2) by a color space subsampling converter 115. The chromance Cr and Cb are down sampled by a factor of two 120 to reduce the amount of data of the Cr and Cb planes, because the human visual system is more sensitive to brightness than color. Therefore, the human visual system will perceive little visual difference in images based on the down sampled Y'CrCb color space (4:2:2), while Y'CrCb video data is approximately two thirds of the R'G'B' video data.

The Y'CrCb frames are then compressed by a H.264 encoder 125. The H.264 encoder applies motion-compensated block encoding to the Y, Cr and Cb planes at one of a plurality of predetermined data rates. The lower the data rate the greater the loss incurred in compressing the data. The compressed data 130 may then be output by the H.264 encoder 125 to a transceiver to transmission across a communication channel, to a computing device readable media (e.g., optical disk, hard disk drive) for storage, or the like 135. The video data may then be reconstructed 140 from the stored or transmitted compressed data 130 by use of a H.264 decoder 145 and optional color space converter 150 in a substantially inverse process.

It is appreciated that the loss incurred as a result of down sampling during conversion from R'G'B' color space to Y'CrCb color space is compounded by any loss incurred in the H.264 encoding/decoding. Accordingly, there is a continuing need for improved encoding/decoding techniques to reduce image compression losses.

SUMMARY OF THE INVENTION

The present technology may best be understood by referring to the following description and accompanying drawings that are used to illustrate embodiments of the present technology.

Embodiments of the present technology are directed toward non-subsampled encoding/decoding techniques. In one embodiment, an encoding method includes receiving frames of R'G'B' data that are converted to planes of each of Y', Cb and Cr data. The planes of Y', Cb and Cr data are encoded according to the H.264 standard, setting the compression parameters of the input Y'-plane as being three times tall and the Cb and Cr-planes set to 128, to generate compressed data. The corresponding decoding method includes decoding the compressed data according to the H.264 standard to generate decompressed Y', Cb and Cr, data, wherein the decoded frames are three times tall.

In another embodiment, a system includes a color space converter and an H.264 encoder. The color space converter is operable to convert R'G'B' data to non-subsampled planes of each of Y', Cb and Cr data. The H.264 encoder is operable to encode the planes of Y', Cb and Cr data into compressed data, wherein one or more encoding parameters specify that the Y'-plane comprises three separate color frames that are not interleaved and the Cb and Cr-planes are set to 128. The system may also include an H.264 decoder operable to decode the compressed data into decompressed planes of each of Y', Cb and Cr data, wherein the decompressed Y'-plane comprises three separate color frames that are not interleaved. The system may also include a color space converter operable to convert the decompressed planes of each of Y', Cb and Cr data into recovered R'G'B' data.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
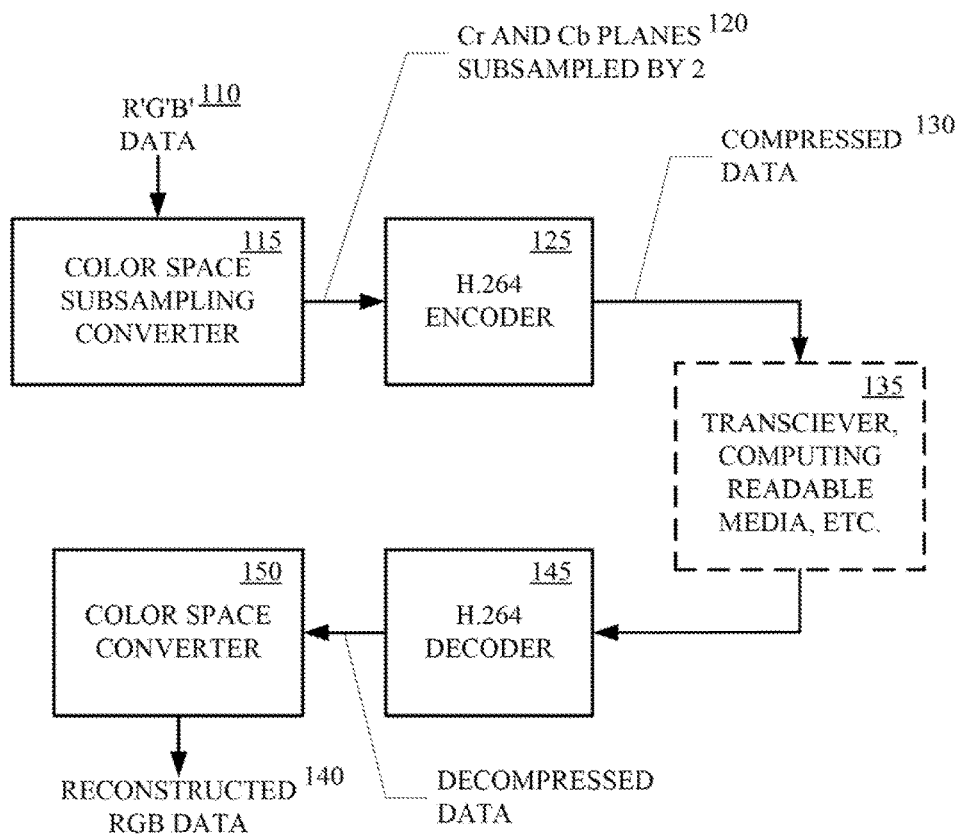
FIG. 1 shows a block diagram of an image encoding and decoding system according to the conventional art.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Figure 2:
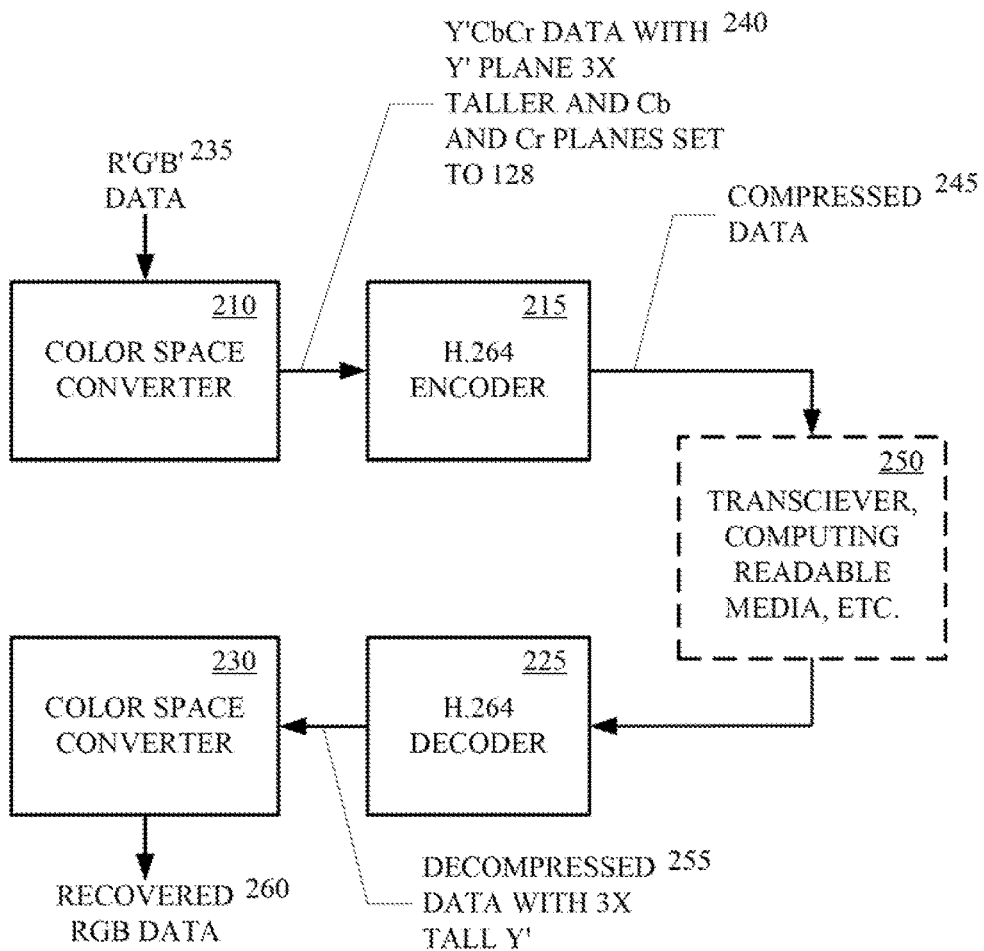
FIG. 2 shows a block diagram of an image encoding and decoding system in accordance with one embodiment of the present technology.
Figure 3:
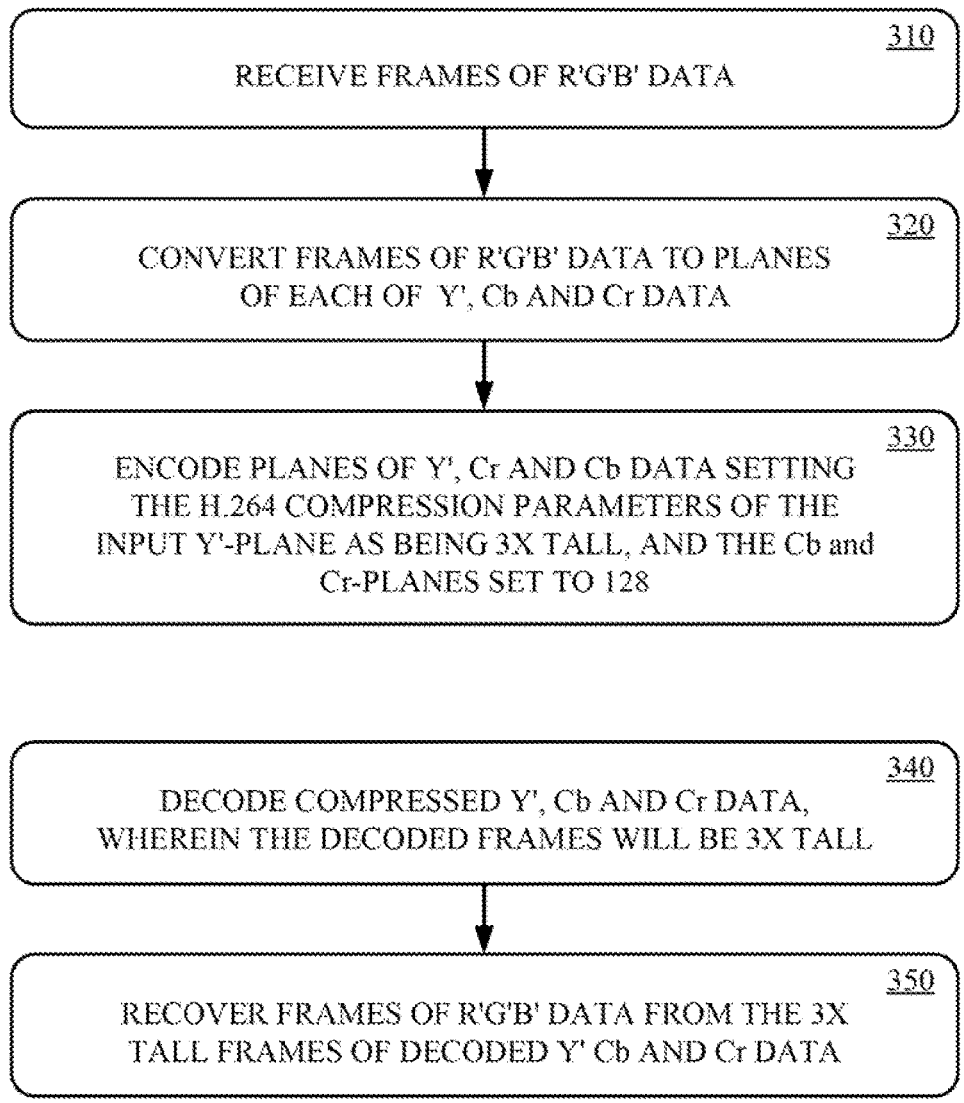
FIG. 3 shows a flow diagram of an image encoding and decoding method in accordance with one embodiment of the present technology.

Referring now to FIG. 2, a block diagram of an image encoding and decoding system 200, in accordance with one embodiment of the present technology, is shown. The encoding system includes a color space converter module 210, an H.264 encoder 215 with one or more parameters configured for the Y' plane 3× taller and the Cb and Cr planes set to 128. The decoding system includes an H.264 decoder 225 and optionally a color space converter 230. Operation of the encoding and decoding systems 200 will be further explained with reference to FIG. 3, which shows an image encoding and decoding method in accordance with one embodiment of the present technology. The method may begin with receiving frames of R'G'B' data, at 310. In one implementation the frames of R'G'B' data 235 are received by the color space converter 210. At 320, the frames of R'G'B' data 235 are converted into frame of Y'CrCb data by the color space converter 220. At 330, the frames of Y'CrCb data are encoded by a H.264 encoder 215 according to the H.264 standard with one or more encoding parameters specifying that the Y'-plane comprises three separate color frames that are not interleaved and the Cb and Cr-planes are set to 128. Accordingly, the Y'-plane input is 3× taller 240, and the chroma is 0 when the Cr and Cb planes are set to 128. The compressed data 245 may be output by the H.264 encoder 215 to a transceiver for communication across a communication link, a computing device readable media for storage and/or the like 250. For example, the compressed data 245 may be stored on a digital video disk (DVD). In another example, the compressed data 245 may be transferred across a communication link from a server that renders the image frame to a client computing device that decompresses and recovers the frame data for display at the client computing device.

At 340, the compressed data 245 is received by an H.264 decoder 225. In one implementation, the compressed data 245 or additional data received with the compressed data 245 indicates that the Y-plane is 3× taller and the chroma planes are set to 128. The H.264 decoder 225 decodes the compressed data into decompressed data with 3× tall Y plane data 255. The 3× tall Y plane data 255 may be filtered to extract the Y component while ignoring the Cr and Cb chroma components. Optionally, the decompressed data 255 may be input to a color space converter 230 to recover the R'G'B' data 260, at 350. In one implementation, the recovered R'G'B' data 260 may be rendered on a display.

It is appreciated that the functions performed by the H.264 encoder and H.264 may be integrated to implemented the non-subsampled image encoding and decoding in a H.264 codec. Similarly, it is appreciated that the functions of the color space converters coupled to the encoders and decoders may be integrated into the respective H.264 encoder and H.264 decoder or may be integrated into the H.264 codec. It is also appreciated that the non-subsampled image encoding and decoding, in accordance with embodiments of the present technology may be implemented in hardware, firmware, software, or a combination of one or more thereof.

Figure 4:
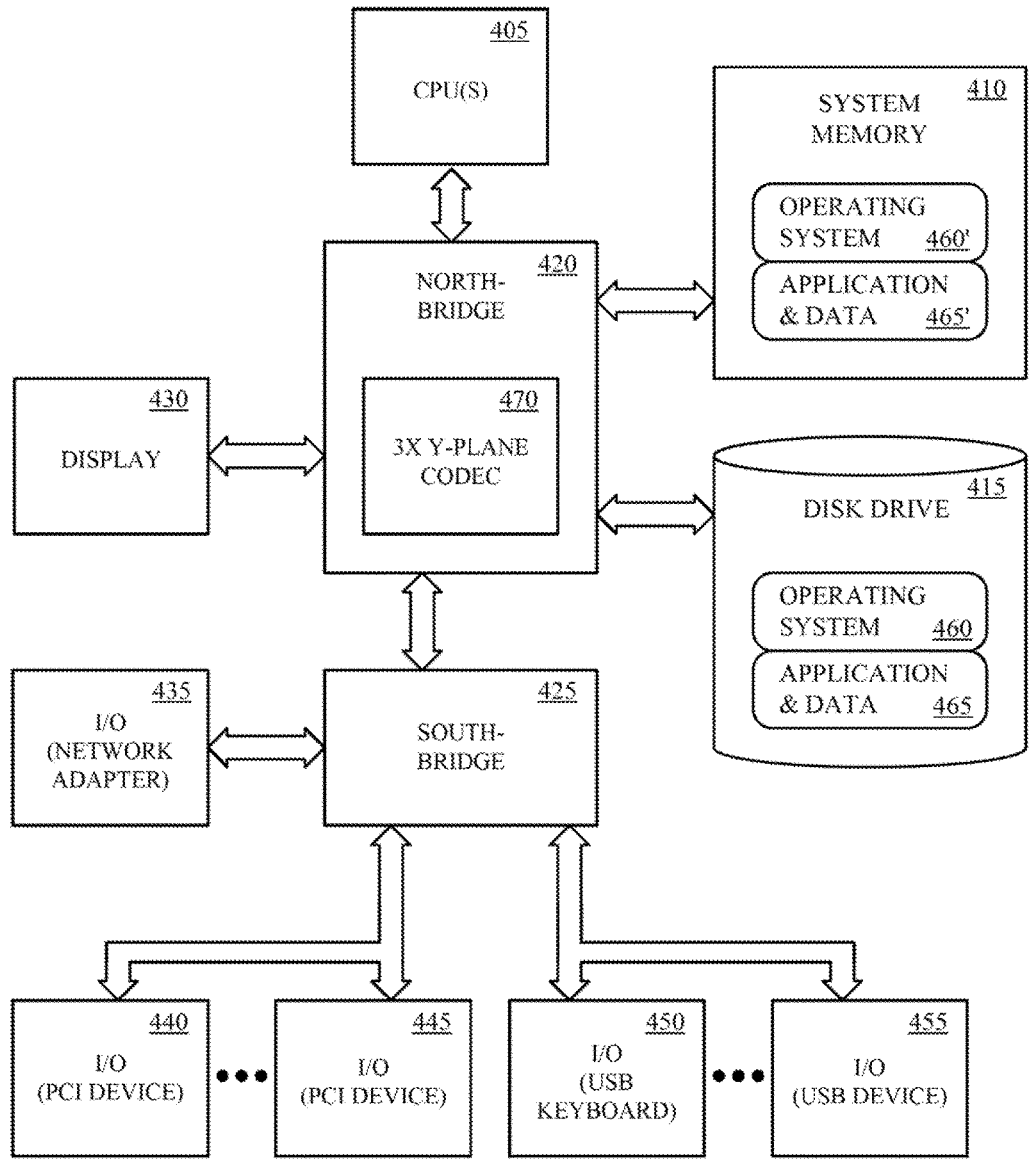
FIG. 4 shows a block diagram of an exemplary computing platform for implementing image encoding and decoding in accordance with one embodiment of the present technology.

Referring now to FIG. 4, a block diagram of an exemplary computing platform for implementing non-subsampled image encoding and decoding, in accordance with one embodiment of the present technology, is shown. The exemplary computing platform may include one or more central processing units (CPUs) 405, one or more graphics processing units (GPUs) (not shown), volatile and/or non-volatile memory (e.g., computer readable media) 410, 415, one or more chip sets 420, 425, and one or more peripheral devices 430-455 communicatively coupled by one or more busses.

The chipset 420, 425, acts as a simple input/output hub for communicating data and instructions between the CPU 405, the computing device-readable media 410, 415, and peripheral devices 430-455. In one implementation, the chipset includes a northbridge 420 and southbridge 425. The northbridge 420 provides for communication between the CPU 405, system memory 410 and the southbridge 425. The southbridge 425 provides for input/output functions. The peripheral devices 430-455 may include a display device 430, a network adapter (e.g., Ethernet card) 435, CD drive, DVD drive, a keyboard, a pointing device, a speaker, a printer, and/or the like.

The computing device-readable media 410, 415, may be characterized as primary memory and secondary memory. Generally, the secondary memory, such as a magnetic and/or optical storage, provides for non-volatile storage of computer-readable instructions and data for use by the computing device. For instance, the disk drive 415 may store the operating system (OS) 460, applications (e.g., programs, drivers, routines, utilities) and data 465. The primary memory, such as the system memory 410 and/or graphics memory (not shown), provides for volatile storage of computer-readable instructions and data for use by the computing device. For instance, the system memory 410 may temporarily store all or a portion of the operating system 460', and all or a portion of one or more applications and associated data 465' that are currently used by the CPU 405, GPU and the like.

One or more applications may operate on video data. For example, a gaming application may render 3-dimensional frame data for output on the display. Similarly, a video application may output video frame data to the display. In one implementation, the chipset 420, 425, includes an integral 3× Y-plane codec 470. The 3× Y-plane codec 470 may be implemented in hardware or firmware of the northbridge 420. The 3× Y-plane codec 470 operates substantially the same as the image encoding and decoding system 200 as described above with regard to FIGS. 2 and 3. The 3× Y-plane codec 470 converts the R'G'B' data into Y'CrCb data, and encodes the Y'CrCb data according to the H.264 standard with one or more compression parameters set as being 3× taller and the Cr and Cb planes set to 128 or 0 chroma. The R'G'B' data may be recovered by the 3× Y-plane codec 470 from the compressed data by a substantially inverse process.

Figure 5:
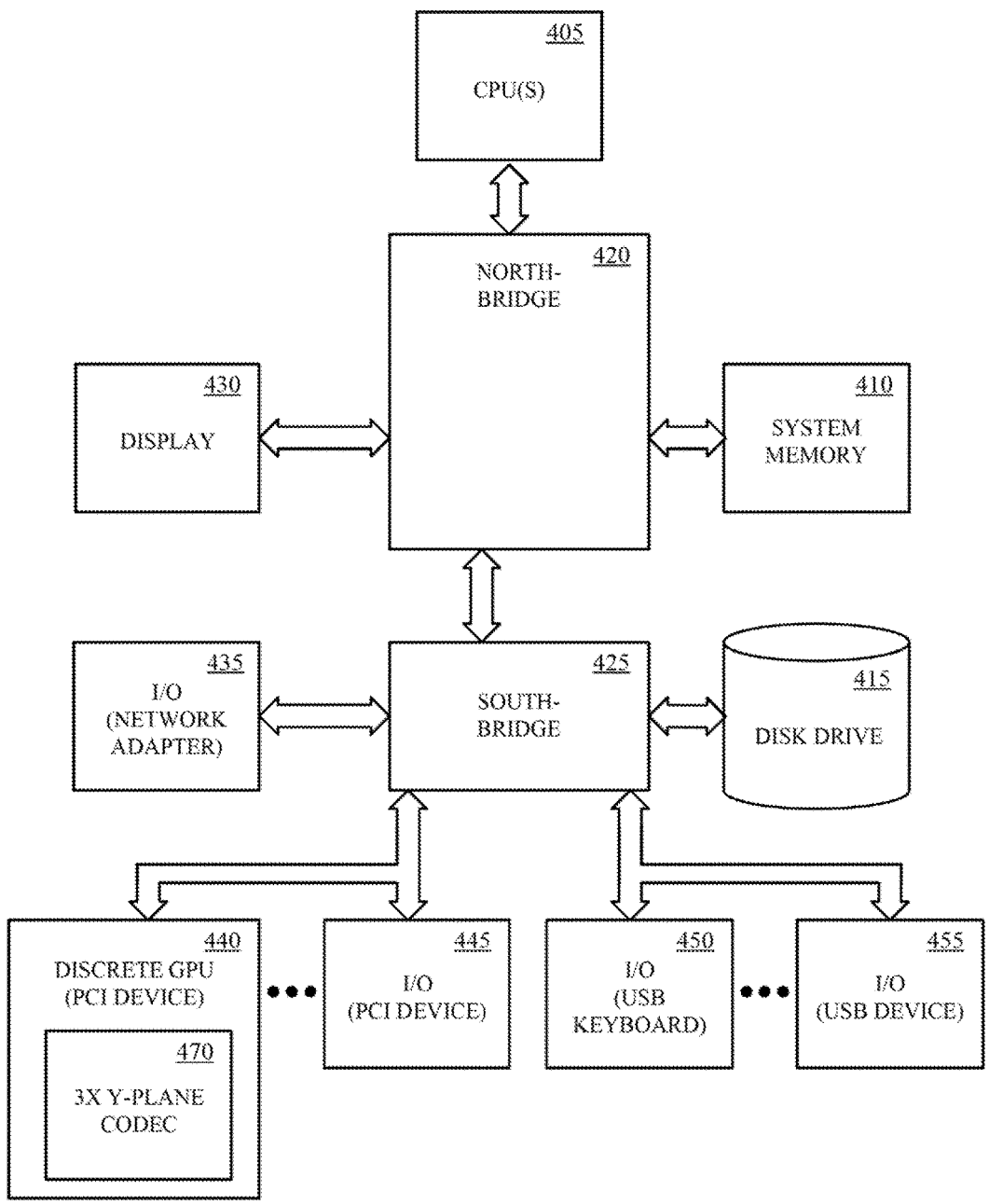
FIG. 5 shows a block diagram of another exemplary computing platform for implementing image encoding and decoding in accordance with one embodiment of the present technology.

FIG. 5 shows a block diagram of another exemplary computing platform for implementing non-subsampled image encoding and decoding in accordance with one embodiment of the present technology. The exemplary computing platform is substantially similar to the computing platform as described with reference to FIG. 4. However, the 3× Y-plane codec 470 is instead implemented in a graphics processing unit (GPU). The graphics processing unit may be a discrete GPU 400 or an integrated GPU (not shown). In one implementation, one or more portions of the 3× Y-plane codec 470 may be implemented by one or more pipeline stages. For example, the pixel shader of the GPU may be used for performing motion estimation of the H.264 encoder. In another implementation, the GPU may include a dedicated 3× Y-plane codec 470 hardware circuit. The frame data may be input to the 3× Y-plane codec 470. The 3× Y-plane codec 470 may converts the R'G'B' data into Y'CrCb data, and encodes the Y'CrCb data according to the H.264 standard with one or more compression parameters set as being 3× taller and the Cr and Cb planes set to 128 or 0 chroma. The R'G'B' data may be recovered by the GPU from the compressed data by a substantially inverse process, as described above with reference to FIGS. 2 and 3.

Figure 6:
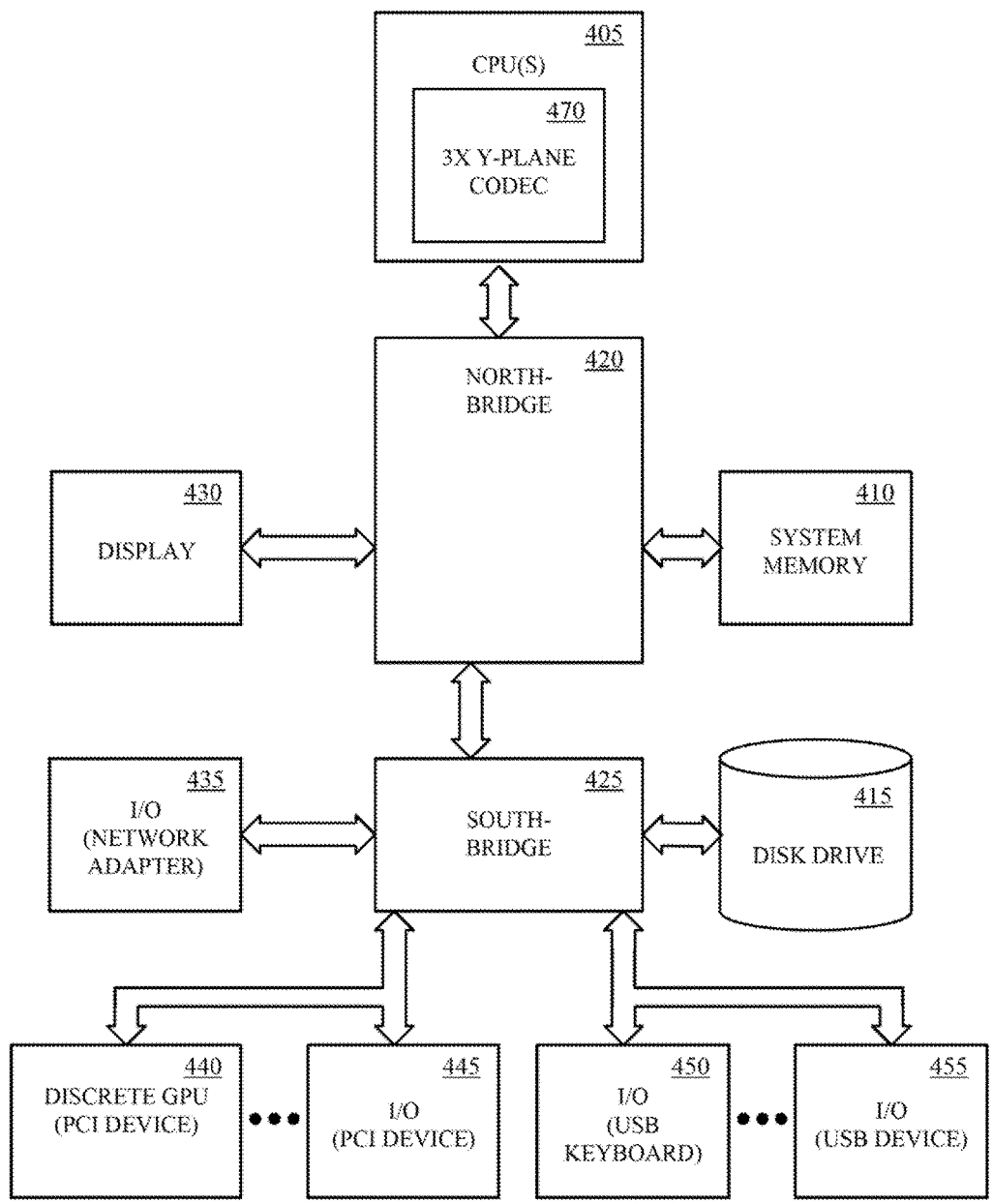
FIG. 6 shows a block diagram of yet another exemplary computing platform for implementing image encoding and decoding in accordance with an embodiment of the present technology.

FIG. 6 shows a block diagram of yet another exemplary computing platform for implementing non-subsampled image encoding and decoding in accordance with one embodiment of the present technology. Again, the exemplary computing platform is substantially similar to the computing platform as described with reference to FIG. 4. However, the 3× Y-plane codec 470 is instead implemented in software. In one implementation, one or more processors, such as the CPU 405, executing computing device readable instructions, such as a 3× Y-plane codec routine 470, stored in one or more computing device readable media, such as a disk drive 415 and/or system memory 410, converts R'G'B' data into Y'CrCb data and encodes the Y'CrCb data according to the H.264 standard with one or more compression parameters set as being 3× taller and the Cr and Cb planes set to 128 or 0 chroma. The R'G'B' data may be recovered by the 3× Y-plane codec routine 470 from the compressed data by a substantially inverse process, as described above with reference to FIGS. 2 and 3.

In empirical measurements of graphics rendered data frames the H.264 compressed data 245 in accordance with embodiments of the present technology is approximately 2.3× larger than subsampled 13.264 compressed data according to the conventional art. However, embodiments of the present technology advantageously reduce or eliminate the compounding of loss due to subsampling when performing H.264 compression and decompression. Furthermore, embodiments of the present technology enable better control of losses due to H.264 compression and decompression (e.g., quantization and motion compensated compression ratio) by removing the losses due to subsampling.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   receiving frames of R'G'B' data;
   converting the frames of R'G'B' data to planes of each of Y', Cb and Cr data without down sampling Cb and Cr; and
   encoding the planes of Y', Cb and Cr data according to the H.264 standard, wherein the encoding comprises:
   setting compression parameters of the input Y' as being three times as tall as the original video height, wherein the Y' is height of original Y plus height of Cb and height of Cr; and
   setting and maintaining the Cb and Cr planes to a predetermined value, to generate compressed data.

2. The method according to claim 1, wherein the three times tall Y'-plane comprises three separate color frames that are not interleaved.

3. The method according to claim 1, further comprising outputting the compressed data on a communication link.

4. The method according to claim 1, further comprising storing the compressed data on a computing device readable media.

5. The method according to claim 1, further comprising decoding the compressed data according to the H.264 standard to generate decompressed Y', Cb and Cr data, wherein corresponding decoded frames will be three times tall.

6. The method according to claim 5, further comprising converting the decompressed Y', Cb and Cr data to generate recovered frame of R'G'B'.

7. The method according to claim 5, wherein the compressed data is received from a communication link.

8. The method according to claim 5, wherein the compressed data is read from a computing device readable media.

9. The method according to claim 1, wherein the predetermined value is 128.

10. The method according to claim 9, wherein the value 128 specifies the chroma is 0.

11. A system comprising:
a color space converter to convert R'G'B' data to non-subsampled planes of each of Y', Cb, and Cr data; and
an H.264 encoder to encode the planes of Y', Cb and Cr data into compressed data, wherein one or more encoding parameters specify that the Y plane comprises three separate color frames that are not interleaved, wherein the color frames are R', G', and B' and the Cb and Cr planes are set and maintained at a predetermined value.

12. The system of claim 11, further comprising an H.264 decoder to decode the compressed data into decompressed planes of each Y', Cb and Cr data, wherein the decompressed Y'-plane comprises three separate color frames that are not interleaved.

13. The system of claim 12, further comprising a color space converter to convert the decompressed planes of each Y', Cb and Cr data into recovered R'G'B' data.

14. The system of claim 11, wherein the color space converter is integral to the H.264 encoder.

15. The system of claim 13, wherein the color space converter is integral to the H.264 decoder.

16. The system of claim 13, wherein the H.264 encoder and the H.264 decoder are integral to a H.264 codec.

17. The system of claim 16, further comprising a chipset of computing devices including the H.264 codec.

18. The system of claim 16, further comprising a graphics processing unit including the H.264 codec.

19. The system of claim 16, further comprising computing device executable instructions stored in one or more computing device readable media that when executed by a processing unit implement the H.264 codec.

20. The system of claim 11, wherein the predetermined value is 128.

* * * * *